United States Patent [19]

Yamaguchi

[11] Patent Number: 4,934,628
[45] Date of Patent: Jun. 19, 1990

[54] COUNTER HOUSING FOR FISHING

[75] Inventor: Akira Yamaguchi, c/o Daiwa Seiko, Inc., No. 3-14-16, Maesawa, Higashikurume-shi, Tokyo, Japan

[73] Assignee: Daiwa Seiko, Inc., Higashikurume, Japan

[21] Appl. No.: 395,152

[22] Filed: Aug. 17, 1989

Related U.S. Application Data

[63] Continuation of Ser. No. 146,643, Jan. 21, 1988, abandoned.

[30] Foreign Application Priority Data

Jan. 23, 1987 [JP] Japan ............................. 62-8330[U]

[51] Int. Cl.$^5$ ............................................ A01K 89/015
[52] U.S. Cl. ..................................... 242/223; 242/279
[58] Field of Search ............... 242/223, 278, 279, 280, 242/281

[56] References Cited

U.S. PATENT DOCUMENTS

| | | | |
|---|---|---|---|
| 2,089,031 | 8/1937 | MacDonald | 242/84.1 M X |
| 2,489,614 | 11/1949 | Brikoff | 242/84.1 M X |
| 2,613,883 | 10/1952 | Limpright | 242/84.1 M |
| 2,752,686 | 7/1956 | Anderson et al. | 242/84.1 M |
| 3,909,949 | 10/1975 | Miyamae | 33/129 |
| 4,585,182 | 4/1986 | Atobe | 242/84.1 M |
| 4,620,371 | 11/1986 | Murakami et al. | 33/129 |
| 4,657,200 | 4/1987 | Parylak | 242/84.1 R |
| 4,697,758 | 10/1987 | Hirose et al. | 242/84.1 M |

FOREIGN PATENT DOCUMENTS 15847 4/1982 Japan ............................. 242/84.1 M
60-17681 2/1985 Japan .

Primary Examiner—Joseph J. Hail, III
Attorney, Agent, or Firm—Cushman, Darby & Cushman

[57] ABSTRACT

An improved counter housing assembly for a fishing reel of the type supporting a spool at both ends includes left and right side frame elements for holding the spool and one or more support frames connecting the frame elements. A case is formed integrally with one of the support frames for housing a counter mechanism. This arrangement isolates the counter mechanism against external shocks, and does not impede manipulation or handling of the reel by a user.

1 Claim, 2 Drawing Sheets

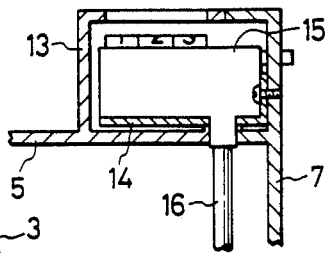
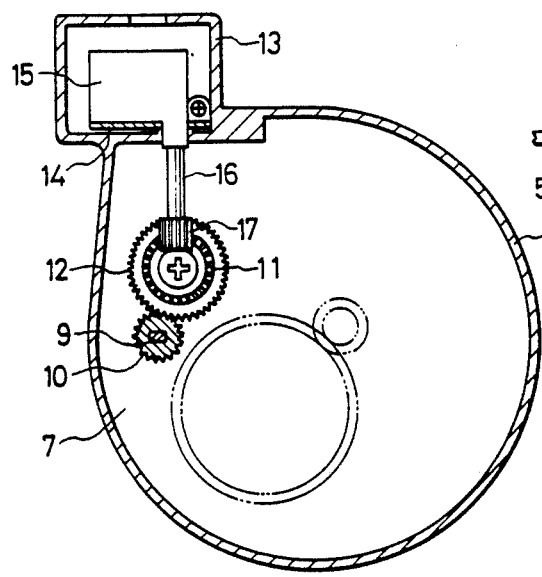
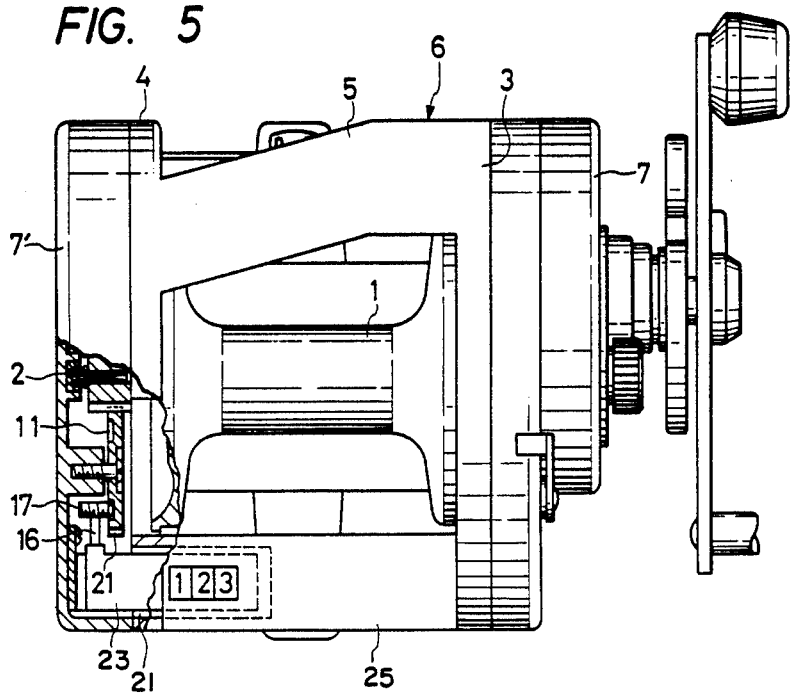

COUNTER HOUSING FOR FISHING

This is a continuation division of Application No. 146,643, filed Jan. 21, 1988, which was abandoned upon the filing hereof.

BACKGROUND OF THE INVENTION

1. Field of the Invention

The present invention relates to fishing reels of the type having a spool shaft supported at both ends and a counter for measuring the quantity of a fishline unwound from the reel.

2. Description of the Prior Art

In one first type of conventional counter for measuring the quantity of fishline unwound from a fishing reel a case housing the counter is integrally formed on a side plate cover located outside a frame, as is disclosed in the Japanese utility Model Application (OPI) No. 17681/85 (the term "OPI" as used herein means an "unexamined published application"). Another type of conventional counter for measuring the quantity of a fishline unwound from a fishing reel includes a case for housing the counter attached to the upper portion of the reel.

One drawback of the first type of conventional counter is that the presence of the counter impedes holding and manipulation of the fishing reel. This type of conventional counter has another drawback in that the side plate cover is often distorted or damaged when a strong force is applied thereto due to holding and manipulating of the reel. The second type of conventional counter has the disadvantage that the joint between the case and the fishing reel is often damaged.

SUMMARY OF THE INVENTION

The present invention was made in order to eliminate the above-mentioned drawbacks.

Accordingly, it is an object of the present invention to provide a fishing reel of the type having a spool shaft supported at both its ends, in which the above described drawbacks of the prior art have been obviated. A fishing reel constructed according to the present invention has a frame assembly formed by coupling right and a left side frames to each other with at least one support frame. At least one of the support frames is integrally formed with a case for a counter that is provided to measure the quantity of fishline unwound from the fishing reel. The support frame isolates the counter and the case from shocks and facilitates handling of the counter for repairing, replacement, cleaning and so forth. Since the case is resistant to shock, the case and the counter are less likely to be damaged when the fishing reel collides against something or is dropped.

Other objects, features, and characteristics of the present, invention, as well as the methods and operation and functions of the related elements of the structure, and to the combination of parts and economies of manufacture, will become apparent upon consideration of the following description and the appended claims with reference to the accompanying drawings, all of which form a part of this specification, wherein like reference numerals designate corresponding parts in the various figures.

DESCRIPTION OF THE DRAWINGS

FIG. 3 is a cross-sectional view of the embodiment of FIGS. 1 and 2 taken along line A—A in FIG. 2;

FIG. 4 is a longitudinal sectional partial view of the embodiment shown in FIG. 1; and FIG. 5 is a cutaway plan view of a second embodiment of the present invention.

DETAILED DESCRIPTION OF THE PREFERRED EMBODIMENTS

Figure 1:
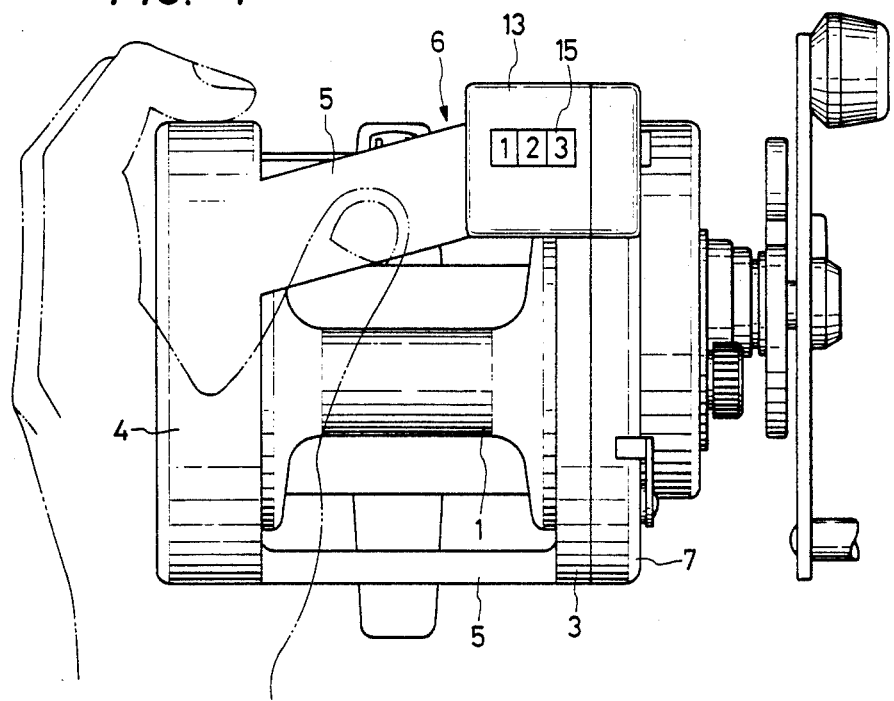
FIG. 1 is a plan view of a first preferred embodiment of the present invention.
Figure 2:
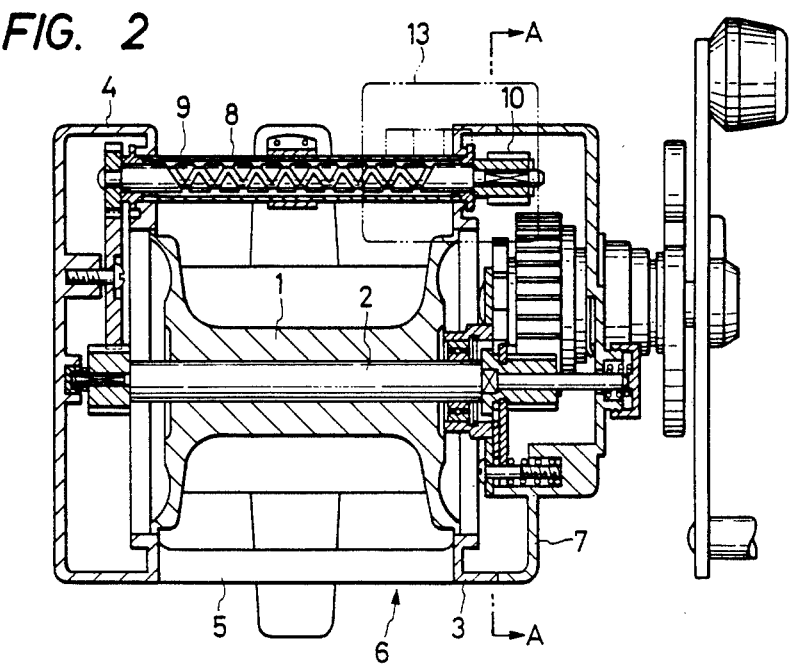
FIG. 2 is a longitudinal sectional view of the embodiment shown in FIG. 1.

FIGS. 1, 2, 3 and 4 illustrate a fishing reel constructed according to a first preferred embodiment of the present invention, in which a spool shaft 2 is supported at both its ends. In this fishing reel, left and right side frames 4, 3 are provided for supporting the spool shaft 2, to which a spool 1 is secured. The left and right side frames 4, 3 are coupled to each other by one or more support frames 5 which form a frame assembly 6. A side plate cover 7 is attached to the outside of the right side frame 3. A mechanism for driving the spool shaft 2, a clutch mechanism and so forth are housed within the side plate cover 7. A level winder 8, which is rotated in conjunction with the spool shaft 2, is provided at the front portion of the frame assembly 6. A gear 10 is secured to the end portion of the rotary shaft 9 of the level winder 8 near the right side frame 3. Gear 10 is engaged with a gear 12 which is rotatably supported by a screw or the like to the side plate cover 7, includes a gear 11 which constitutes a portion of its surfaces, and has teeth provided along the circumference of the gear 11 similar to those of a crown gear or a face gear. The support frame 5 constituting the upper portion of the frame assembly 6 is integrally formed with a case 13 adjacent the right side frame 3. A counter 15 for measuring the quantity of fishline unwound from the fishing reel is attached to the inside of case 13 and to the side plate cover 7 by an interposed attaching plate 14, as is shown in FIG. 3. A pinion 17 is secured to the lower end portion of rotary shaft 16 of the counter 15 and is engaged with the gear 11.

As the fishline is being unwound from the fishing reel, a thumb is put on the top of the support frame 5 to hold the fishing reel, as shown in FIG. 1. At this time, rotation of the spool shaft 2 is transmitted to the rotary shaft 16 of the counter 15 through the rotary shaft 9 of the level winder 8, the gears 10, 12 and 11 and the pinion 17 so that the quantity of fishline unwound from the fishing reel is measured and displayed by the counter. Because the case 13 is supported on both of its ends by the support frame 5 and side plate cover 7, it is resistant to shocks that may be imported thereto by sudden unexpected contact with the ground or other objects. In addition, the case 13 is located in a position that will not interfere with its holding or manipulation during use.

FIG. 5 depicts a second preferred embodiment of the present, invention which also has a spool shaft 2 supported at both its ends. In this embodiment, side plate covers 7 and 7' are attached to the outside of right and left side frames 3, 4, respectively. A support frame 25 which constitutes the rear portion of a frame assembly 6 includes a case 21 formed integrally within the left side frame 4. A counter 23 is provided in the case 21 to be driven by a gear mechanism in conjunction with rotation of the spool shaft 2.

Since the counters 15 are provided in the side frames 3, 4 attached to the side covers 7 and 7' in this embodiment, respectively, the positions of the counters are conveniently accessible for repairing, replacement, cleaning and so forth. In addition, the counter 23 in the second embodiment of the present invention is insulated from unexpected shocks by the support frame 25, and its location does not impede access or manipulation by an operator during use.

While the invention has been described in connection with what is presently considered to be the most practical and preferred embodiment, it is to be understood that the invention is not limited to the disclosed embodiment, but, on the contrary, is intended to cover various modifications and equivalent arrangement included within the spirit and scope of the appended claims.

What is claimed is:

1. A fishing reel for supporting a spool of fishing line to be wound and unwound, comprising:
    a spool shaft secured to said spool to rotate together with said spool,
    left and right side frames for supporting said spool shaft,
    an upper frame connected to said right and left side frames at upper portions thereof,
    a lower frame connected to said left and right side frames at lower portions thereof,
    counter means for measuring the amount of fishing line that has been unwound from the reel, said counter means being provided on said upper frame,
    a side plate cover attached to the outside of said right side frame,
    a mechanism for driving the spool shaft,
    a clutch mechanism, said mechanisms being housed within said side plate cover,
    a level winder rotated in conjunction with said spool shaft, said level winder being provided at a front portion of said fishing reel,
    a rotary shaft fixed to said level winder to rotate together with said level winder,
    a gear secured to the end portion of said rotary shaft near the right side of said right side frame, and
    transmission gear means for transmitting the rotation of said spool shaft to said rotary shaft, said transmission gear means being provided within said left side frame,
characterized in that;
    said upper frame is formed integrally with said right and left side frames,
    said lower frame is formed integrally with said right and left side frames,
    said counter means functions in accordance with the rotation of said rotary shaft through said gear, and
    said upper frame comprises case means for housing said counter means, said case means being formed integrally with said upper frame proximate said right side frame to avoid contact with a thumb of a user and so as to be a permanent portion of said upper frame.

* * * * *